(12) United States Patent
Chang

(10) Patent No.: US 6,730,430 B2
(45) Date of Patent: May 4, 2004

(54) EXPLOSION-PROOF SAFETY STRUCTURE FOR COLUMN SHAPE LITHIUM BATTERY

(75) Inventor: Chin Lung Chang, Taipei (TW)

(73) Assignee: Nan Ya Plastics Corporation, Taipei (TW)

( * ) Notice: Subject to any disclaimer, the term of this patent is extended or adjusted under 35 U.S.C. 154(b) by 234 days.

(21) Appl. No.: 09/900,202

(22) Filed: Jul. 9, 2001

(65) Prior Publication Data

US 2003/0013005 A1 Jan. 16, 2003

(51) Int. Cl.⁷ .............................. H01M 2/12; H01M 2/08
(52) U.S. Cl. .............................. 429/53; 429/54; 429/61; 429/174; 429/185
(58) Field of Search .................. 429/61, 53, 174, 429/56, 163, 185, 82, 54

(56) References Cited

U.S. PATENT DOCUMENTS

| | | | |
|---|---|---|---|
| 5,462,820 A | * 10/1995 | Tanaka | ........................ 429/174 |
| 5,747,187 A | 5/1998 | Byon | |
| 5,766,791 A | 6/1998 | Takahashi et al. | |
| 5,795,674 A | 8/1998 | Shiota | |
| 5,853,912 A | * 12/1998 | Naing et al. | .................. 429/61 |
| 6,045,939 A | 4/2000 | Tateno et al. | |
| 6,180,279 B1 | 1/2001 | Kinuta | |

* cited by examiner

Primary Examiner—Stephen Kalafut
Assistant Examiner—R Alejandro
(74) Attorney, Agent, or Firm—Stevens, Davis, Miller & Mosher, LLP.

(57) ABSTRACT

The present invention relates to an explosion-proof safety structure for column shape lithium battery, particularly relates to a safe and explosion-preventing structure which prevents the battery from ignition or explosion caused by the condition of overcharging described as follows: while the lithium battery is under overcharging condition, a sudden rise of the battery internal temperature takes place and the pressure increases; at the beginning of the sudden rise of temperature, the internal resistance value of the positive temperature coefficient of resistivity board redoubles to slow down the input of current; when the temperature keeps on rising, the electrolyte starts to gasify so as to increase the internal pressure of the battery up to a level which exceeds what the breaker sheet thin portion can take, the thin portion of the breaker sheet breaks to cause an open charging circuit and the charging activity stops; however, the battery internal pressure can not be released, which once exceeds the break pressure of the safety valve, the safety valve explodes to release the pressure.

2 Claims, 3 Drawing Sheets

EXPLOSION-PROOF SAFETY STRUCTURE FOR COLUMN SHAPE LITHIUM BATTERY

BACKGROUND OF THE PRESENT INVENTION

1. Field of the Present Invention

The present invention relates to an explosion-proof safety structure for column shape lithium battery, particularly relates to a structure design for assuring the safety in usage of a lithium battery which has multiple safety securing measurements such as circuit opening and pressure releasing.

2. Description of the Related Prior Art

As we all know, the secondary lithium battery has advantages of big capacity and light weight, which has become, up to date, the most popular one in the secondary battery market. However, while the secondary lithium battery is overcharged caused by charging too long, the electrolyte in the battery decomposes to cause a sudden rise of the battery internal temperature and the internal pressure increases accordingly, which consequently creates a risk of ignition or explosion. Though the conventional secondary lithium battery is installed with an explosion preventing mechanism, the explosion preventing mechanism is too thick so as to occupy too much space; therefore, the capacity of the conventional secondary lithium battery is not easy to upgrade. In addition, these explosion preventing mechanisms have disadvantages of manufacturing cost being too high and number of elements being too much and volume being too huge despite of their protecting function, which retards the development of high capacity lithium battery.

SUMMARY OF THE PRESENT INVENTION

In view of the disadvantages of conventional lithium batteries, the present invention discloses an improvement on the explosion preventing structure which is safer, cheaper, and smaller after many times of testing.

The main purpose of the present invention is to provide an improvement for a safe and explosion preventing structure of a column shape lithium battery. The thin portion of the battery breaker sheet of the present invention breaks to cause an open charging circuit. While the internal pressure of the battery is too high, the safety valve damages to accomplish the purpose of releasing pressure. Meanwhile, the battery stops overcharging so as to prevent the ignition and gas explosion of the battery.

DESCRIPTION OF DRAWING ELEMENTS

| | | | |
|---|---|---|---|
| 1 | top cap | 2 | positive temperature coefficient of resistivity board |
| 3 | safety valve | 4 | insulating ring |
| 5 | breaker sheet | 6 | poly imide insulating sheet |
| 7 | battery shell | 8 | positive electrode conductive sheet |
| 9 | sealing insulating ring | 10 | top cap gas hole |
| 11 | breaker sheet gas hole | 12 | conductive stem of breaker sheet |

A: the pressed broken start point of breaker sheet
B: the pressed broken end point of breaker sheet
C: the pressed broken start point of safety valve
D: the pressed broken end point of safety valve
E: the conductive point at the bottom of safety valve
P: normal internal pressure of battery
P1: abnormal internal pressure of battery
P2: abnormal internal pressure of battery

DETAILED DESCRIPTION OF THE PREFERRED EMBODIMENTS

Figure 1:
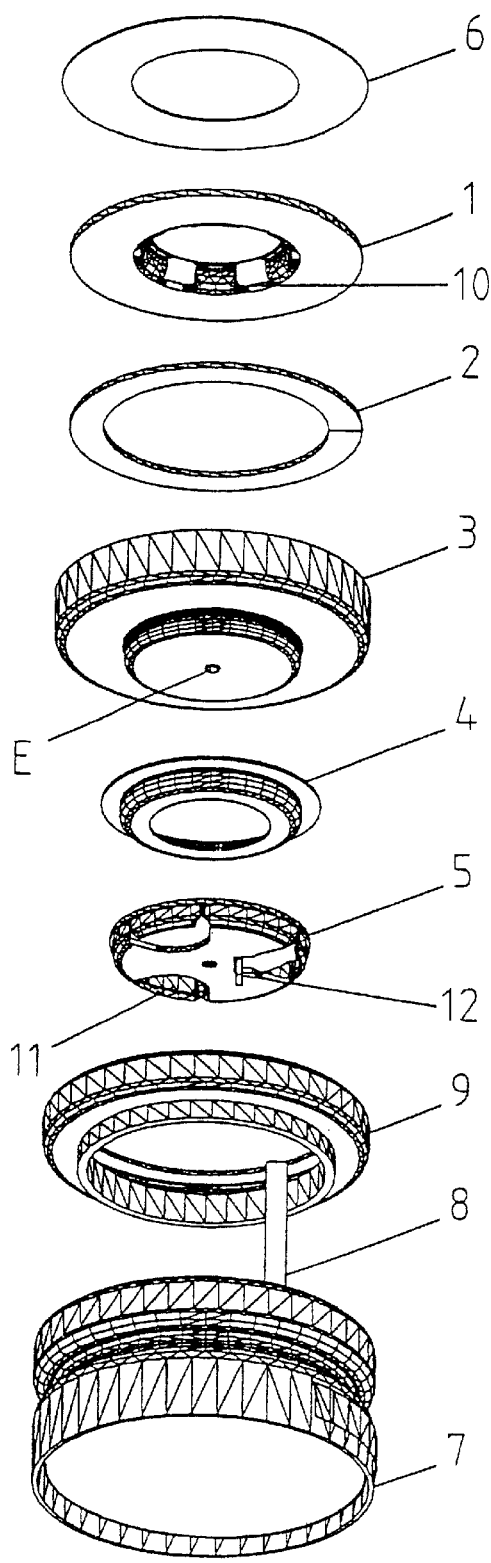
FIG. 1 is a structural analysis drawing of a preferred embodiment of the present invention.

Referring to FIG. 1, the battery structure of the present invention has, from top to bottom, a ring shape poly Imide insulating sheet 6 installed on the top of a top cap 1. A current protecting plate 2 is installed on the bottom of the top cap 1. The poly Imide insulating sheet 6, the top cap 1, and the current protecting plate 2 are installed together in a ring shape flange which is manufactured at the top of a safety valve 3. An insulating ring 4 is installed at the bottom of the safety valve 3, and a breaker sheet 5 is installed thereunder. The breaker sheet 5 has a thin portion and a conductive stem 12. The center point ( also referring to FIG. 3 ) of the bottom of the safety valve 3, which is the conductive point E at the bottom of the safety valve 3, firmly fitted to the center point of the breaker sheet 5 by laser welding. A sealing insulating ring 9 is installed in the bottom of the breaker sheet 5. All the elements are finally installed in the upper internal side of the battery shell 7; then, the upper edges of the battery shell 7, the safety valve 3, and the sealing insulating ring 9 are pressed inward by a sealing machine to bend ninety degrees so as to accomplish a function of sealing and fixing. The preferred embodiment of manufactured battery is shown as FIG. 2.

Figure 2:
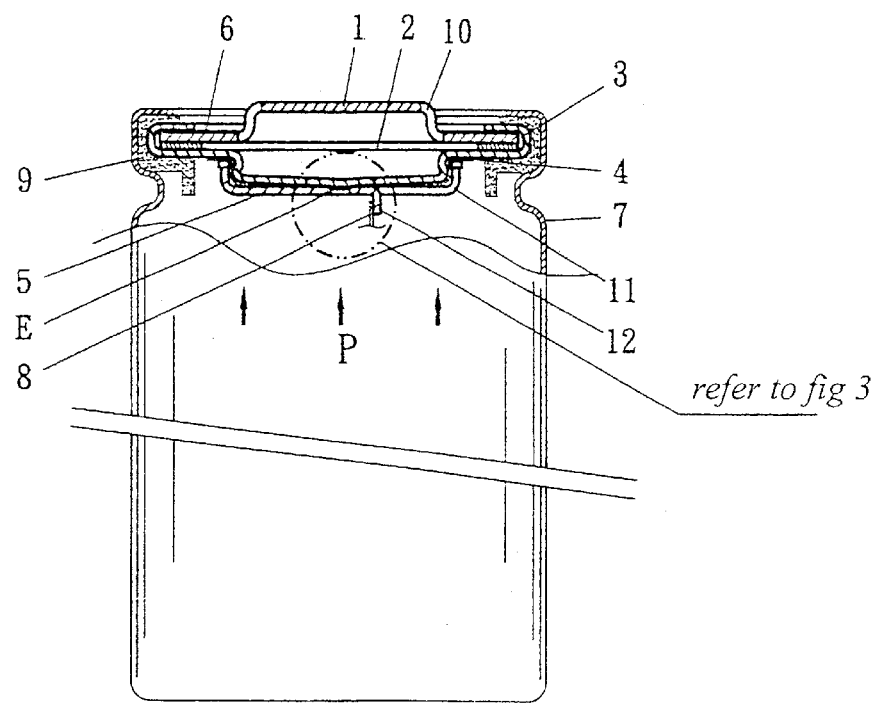
FIG. 2 is a structural section drawing of a preferred embodiment of the present invention, which shows a battery structure under static or normal charging/discharging state.

Referring to FIG. 2, which shows the functioning structure in normal state, the positive electrode power source in the battery shell is conducted from a positive electrode conductive sheet 8, through a conductive stem 12 and a center point of a breaker sheet 5 and a conductive point E at the bottom of the safety valve 3, to the safety valve 3, the positive temperature coefficient of resistivity board 2 (a current protecting plate), and the top cap 1.

Figure 3:
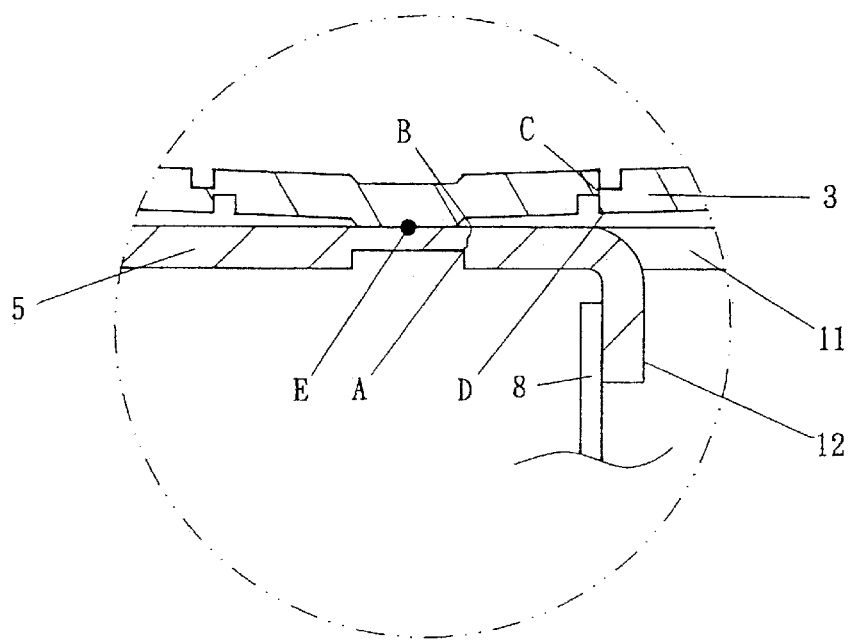
FIG. 3 is a part enlargement of FIG. 2, which discloses in detail a structure of a battery under the protection of an open circuit at static or normal charging/discharging state.
Figure 4:
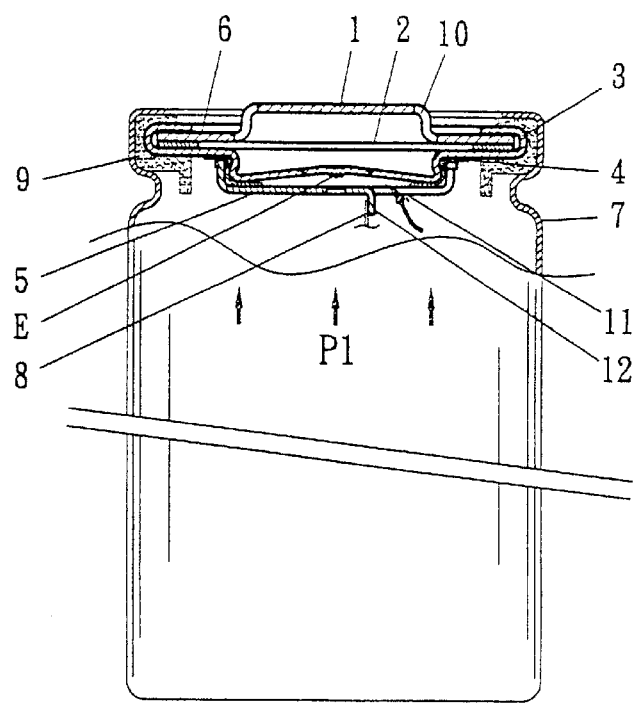
FIG. 4 is a structural schematic drawing of a battery with an open circuit caused by an abnormal rising of the internal pressure in the battery of the preferred embodiment of the present invention.

Referring to FIG. 3, which shows a state of overcharging, the electrolyte decomposes to gas to cause the internal pressure to increase. The internal pressure caused by gas pushes the safety valve 3 upward through the gas hole of the breaker sheet 5. Meanwhile, the conductive point E at the bottom of the safety valve 3 is firmly fitted to the center point of the breaker sheet 5 by laser welding. While the internal pressure reaches a certain level-P1, the thin portion of the breaker sheet 5 breaks from the pressed broken start point A to the pressed broken end point B; at which time, (referring to FIG. 4) the bottom of the safety valve 3 is pushed upward by the internal pressure so as to segregate from the breaker sheet 5 and protrudes upward, which causes an effect of open circuit.

Figure 5:
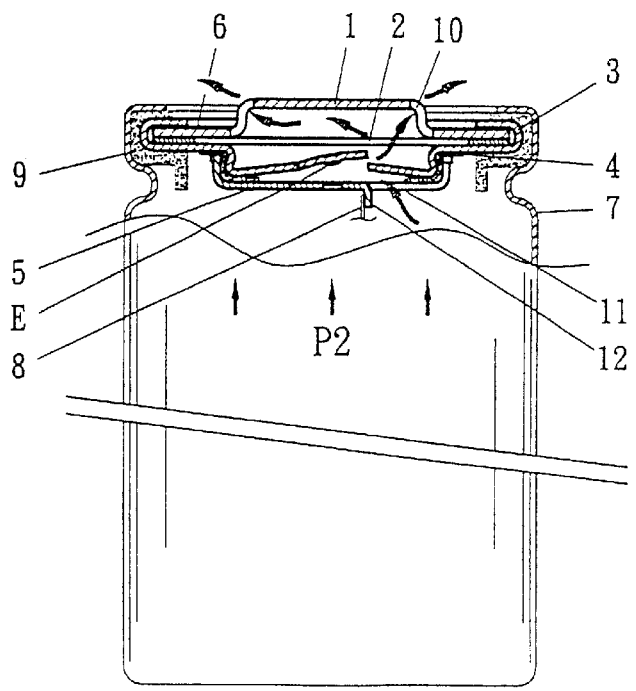
FIG. 5 is a structural schematic drawing of a battery which releases the internal high pressure gas therein caused by an abnormal rising of the internal pressure of the preferred embodiment of the present invention.

Referring to FIG. 3, the bottom portion of the safety valve 3 is provided with two ring grooves which position are relatively adjacent each other and one of which breaks first while pressed by a certain level of internal pressure. When the internal pressure keeps increasing to P2 which exceeds what the ring groove at the corner portion can take, the safety valve breaks from the safety valve pressed broken start point C at the corner portion of ring groove to the safety valve pressed broken end point D; at which time, (referring to FIG. 5) the gas escapes from the broken position at the bottom portion of the safety valve 3, through the opening of the ring shape positive temperature coefficient of resistivity board 2 (a current protecting plate) and the gas hole 10 of the top cap, to the outside of the battery so as to accomplish the purpose of pressure releasing.

What is claimed is:

1. An explosion-proof safety structure for a column shaped lithium battery, the structure comprising:
   a top cap comprising a first annular disk and a frusto-conical or substantially cylindrical first terminal extending from an inner edge of the first annular disk, the first terminal having a hole to vent gas produced internally within the battery to the atmosphere;
   an annular polyimide insulating sheet disposed in contact with a first surface of the first annular disk and circumscribing the first terminal;
   a safety valve comprising a second annular disk, a frusto-conical or substantially cylindrical second terminal extending from an inner edge of the second annular disk, a rim extending from an outer circumferential edge of the second annular disk, and first and second grooves circumferentially formed within the second annular disk on opposite surfaces and disposed closely together, the second terminal having a conductive tip at a distal end from the second annular disk;
   a washer-shaped resistivity board disposed between a second surface opposite the first surface of the first annular disk and a first surface of the second annular disk;
   a breaker sheet having a conductive stem connected to a positive electrode of the battery, the breaker sheet laser welded to the conductive tip of the safety valve and having a thinner cross section near the weld than a cross section far from the weld; and
   an insulating ring disposed between a second surface of the safety valve and a surface of the breaker sheet to provide electrical insulation between a surface area of the safety valve and a surface area of the breaker sheet, wherein:
   the rim of the safety valve is bent inward toward a radial axis of the safety valve to secure the polyimide insulating sheet against the top cap, secure the top cap against the resistivity board, and secure the resistivity board against the safety valve such that the polyimide insulating sheet, the top cap, the resistivity board, and the safety valve are fastened together,
   the thinner cross section of the breaker sheet breaks when a gas pressure within the battery exceeds a first pressure, and the break in the breaker sheet open circuits an electrical path between the first terminal and the positive electrode of the battery, and
   a break opens in the material of the safety valve separating the first and second grooves, when the gas pressure within the battery exceeds a second pressure, to provide a path for the gas pressure to vent to the atmosphere through the hole in the top cap.

2. A safety structure for a battery, the structure comprising:
   a top cap;
   a polyimide insulating sheet disposed in contact with a first surface of the top cap;
   a safety valve having a main body and a rim extending from an outer peripheral edge of the main body; and
   a positive temperature coefficient of resistivity board disposed between a second surface opposite the first surface of the top cap and the main body of the safety valve, wherein:
   the rim of the safety valve is bent inward toward a central part of the safety valve to fasten together the polyimide insulating sheet, the top cap, the resistivity board, and the safety valve.

* * * * *